(12) United States Patent
Rowny et al.

(10) Patent No.: US 10,664,133 B1
(45) Date of Patent: May 26, 2020

(54) AUTOMATED LINKING AND MERGING OF HIERARCHICAL DATA STRUCTURES FOR ANIMATED TRANSITIONS

(71) Applicant: InVisionApp Inc., New York, NY (US)

(72) Inventors: Jonathan Rowny, Purcellville, VA (US); Donald Abrams, Thornton, CO (US); Tom Giannattasio, Bethesda, MD (US)

(73) Assignee: InVisionApp Inc., New York, NY (US)

( * ) Notice: Subject to any disclaimer, the term of this patent is extended or adjusted under 35 U.S.C. 154(b) by 289 days.

(21) Appl. No.: 15/879,393

(22) Filed: Jan. 24, 2018

(51) Int. Cl.
*G06F 3/0482* (2013.01)
*G06F 16/901* (2019.01)

(52) U.S. Cl.
CPC ........ *G06F 3/0482* (2013.01); *G06F 16/9027* (2019.01)

(58) Field of Classification Search
CPC .................... G06F 3/0482; G06F 16/9027
See application file for complete search history.

(56) References Cited

U.S. PATENT DOCUMENTS

| | | | | |
|---|---|---|---|---|
| 5,995,739 A * | 11/1999 | Rotbart | ............... | G06F 9/4498 703/17 |
| 6,826,568 B2 * | 11/2004 | Bernstein | ............... | G06F 16/86 707/749 |
| 2005/0132282 A1 * | 6/2005 | Panditharadhya | .... | G06F 40/154 715/210 |
| 2005/0273721 A1 * | 12/2005 | Yantis | ................... | G06F 16/258 715/762 |
| 2008/0250357 A1 * | 10/2008 | Lee | ..................... | G06F 17/2211 715/853 |
| 2016/0078386 A1 * | 3/2016 | Herzog | ............... | G06F 16/9027 705/7.26 |
| 2019/0095404 A1 * | 3/2019 | Herreria | ............... | G06F 17/227 |

* cited by examiner

*Primary Examiner* — Dino Kujundzic
(74) *Attorney, Agent, or Firm* — McDermott Will & Emery LLP

(57) ABSTRACT

A method for autolinking hierarchies is provided. The method includes receiving an initial hierarchy and a final hierarchy. The method includes determining a set of links from the initial and final hierarchies. The method includes, for each link from the set of links, identifying an unlinked child node from the initial hierarchy of a particular link. The method includes determining a match between the unlinked child node to a second unlinked child node from the final hierarchy of the particular link. The method includes generating a link between the unlinked child node to the second unlinked child node. The method includes providing a new set of links based on the generated link and the set of links. The method includes generating a transition hierarchy based on the new set of links, and the initial and final hierarchies. The method includes generating an animation based on the transition hierarchy.

20 Claims, 16 Drawing Sheets

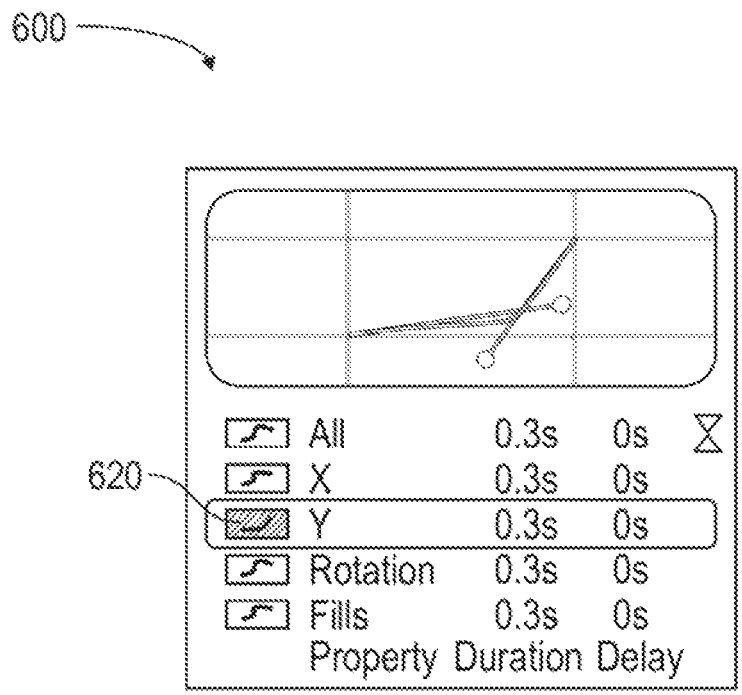
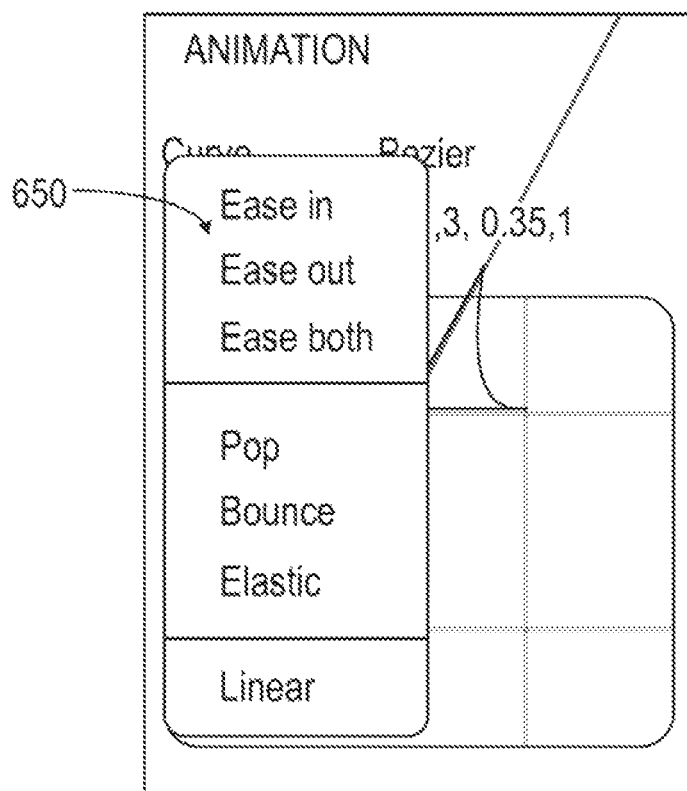
FIG. 6

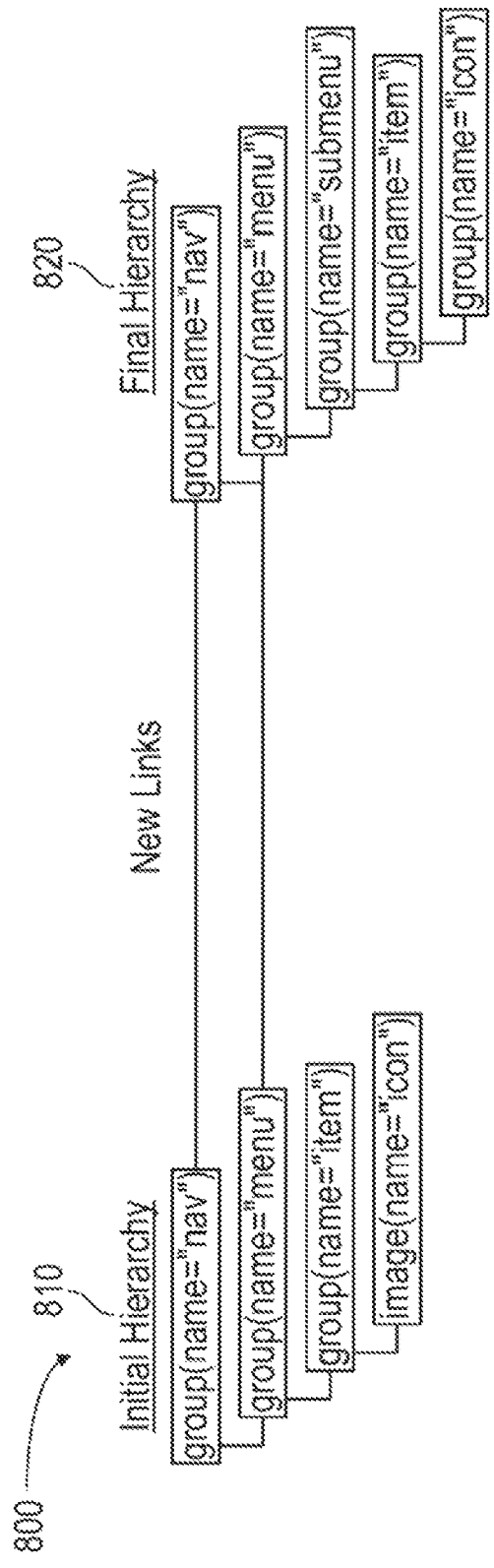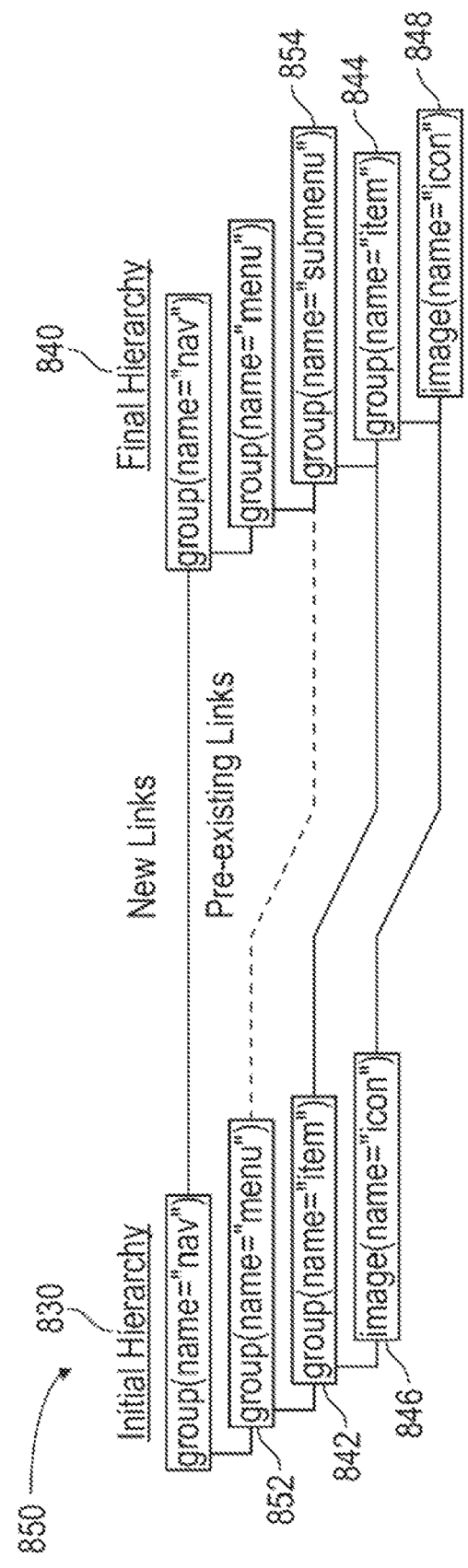

AUTOMATED LINKING AND MERGING OF HIERARCHICAL DATA STRUCTURES FOR ANIMATED TRANSITIONS

BACKGROUND

Field

The present disclosure generally relates to providing animated transitions between representations of graphical interfaces or screens.

Description of the Related Art

Existing applications facilitating design of user interfaces and user interface interactions may also enable a user (e.g., designer) to create animations that appear within the user interface design. However, such applications may not be able to provide automated linking between separate user interface screens in a manner that is flexible and forgoes strict requirements in naming conventions for properties associated with the screens and/or other restrictions.

SUMMARY

In one embodiment of the present disclosure, a computer-implemented method is described for providing autolinking of different hierarchies to facilitate displaying an animation that transitions between the different hierarchies. The computer-implemented method includes receiving an initial hierarchy and a final hierarchy, where the initial hierarchy and the final hierarchy include respective root layers. The computer-implemented method includes determining a first set of links from the initial hierarchy and the final hierarchy. The computer-implemented method includes, for each link from the first set of links, identifying an unlinked child node from the initial hierarchy of a particular link. The computer-implemented method includes determining a match between the unlinked child node to a second unlinked child node from the final hierarchy of the particular link. The computer-implemented method includes generating a respective link between the unlinked child node to the second unlinked child node. The computer-implemented method includes providing a new set of links based at least in part on the generated respective link and the first set of links.

According to one embodiment, a system is described that includes one or more processors and a memory coupled to the one or more processors, the memory including instructions that, when executed by the one or more processors, cause the one or more processors to receive an initial hierarchy and a final hierarchy, where the initial hierarchy and the final hierarchy include respective root layers, each of the respective root layers including at least one child node, determine that the respective root layers are not linked, generate a link between the respective root layers, determine a first set of links from the initial hierarchy and the final hierarchy, the first set of links including at least the link between the respective root layers, for each link from the first set of links, identify an unlinked child node from the initial hierarchy of a particular link, determine a match between the unlinked child node to a second unlinked child node from the final hierarchy of the particular link, generate a respective link between the unlinked child node to the second unlinked child node, and provide a new set of links based at least in part on the generated respective link and the first set of links.

According to one embodiment, a non-transitory, machine readable medium is described that includes instructions, which when executed by one or more processors, cause a computer to perform a method for providing autolinking of different hierarchies to facilitate displaying an animation that transitions between the different hierarchies. The method includes receiving an initial hierarchy and a final hierarchy, where the initial hierarchy and the final hierarchy include respective root layers. The method includes determining a first set of links from the initial hierarchy and the final hierarchy. The method includes, for each link from the first set of links, identifying an unlinked child node from the initial hierarchy of a particular link. The method includes determining a match between the unlinked child node to a second unlinked child node from the final hierarchy of the particular link. The method includes generating a respective link between the unlinked child node to the second unlinked child node. The method includes providing a new set of links based at least in part on the generated respective link and the first set of links. The method includes generating an animation based at least in part on the new set of links, the animation providing a transition from a graphical representation based on the initial hierarchy to a second graphical representation based on the final hierarchy.

In yet other embodiment, a system is described that includes a means for storing commands and a means for executing the commands, causing the system to perform a method that includes receiving an initial hierarchy and a final hierarchy, where the initial hierarchy and the final hierarchy include respective root layers. The means for executing further causes the system to perform the method including determining a first set of links from the initial hierarchy and the final hierarchy. The means for executing further causes the system to perform the method including, for each link from the first set of links, identifying an unlinked child node from the initial hierarchy of a particular link. The means for executing further causes the system to perform the method including determining a match between the unlinked child node to a second unlinked child node from the final hierarchy of the particular link. The means for executing further causes the system to perform the method including generating a respective link between the unlinked child node to the second unlinked child node. The means for executing further causes the system to perform the method including providing a new set of links based at least in part on the generated respective link and the first set of links.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments, and together with the description serve to explain the principles of the disclosed embodiments. In the drawings:

FIG. 6 illustrates a graphical interface for specifying a custom animation curve to transition between changing properties and a graphical interface for using predefined common curves.

FIG. 8A conceptually illustrates a logical diagram of autolinking with unmatched layers, in accordance with some embodiments of the subject technology.

FIG. 8B conceptually illustrates a logical diagram of autolinking with pre-existing links, in accordance with some embodiments of the subject technology.

In the figures, elements and steps denoted by the same or similar reference numerals are associated with the same or similar elements and steps, unless indicated otherwise.

DETAILED DESCRIPTION

Figure 1:
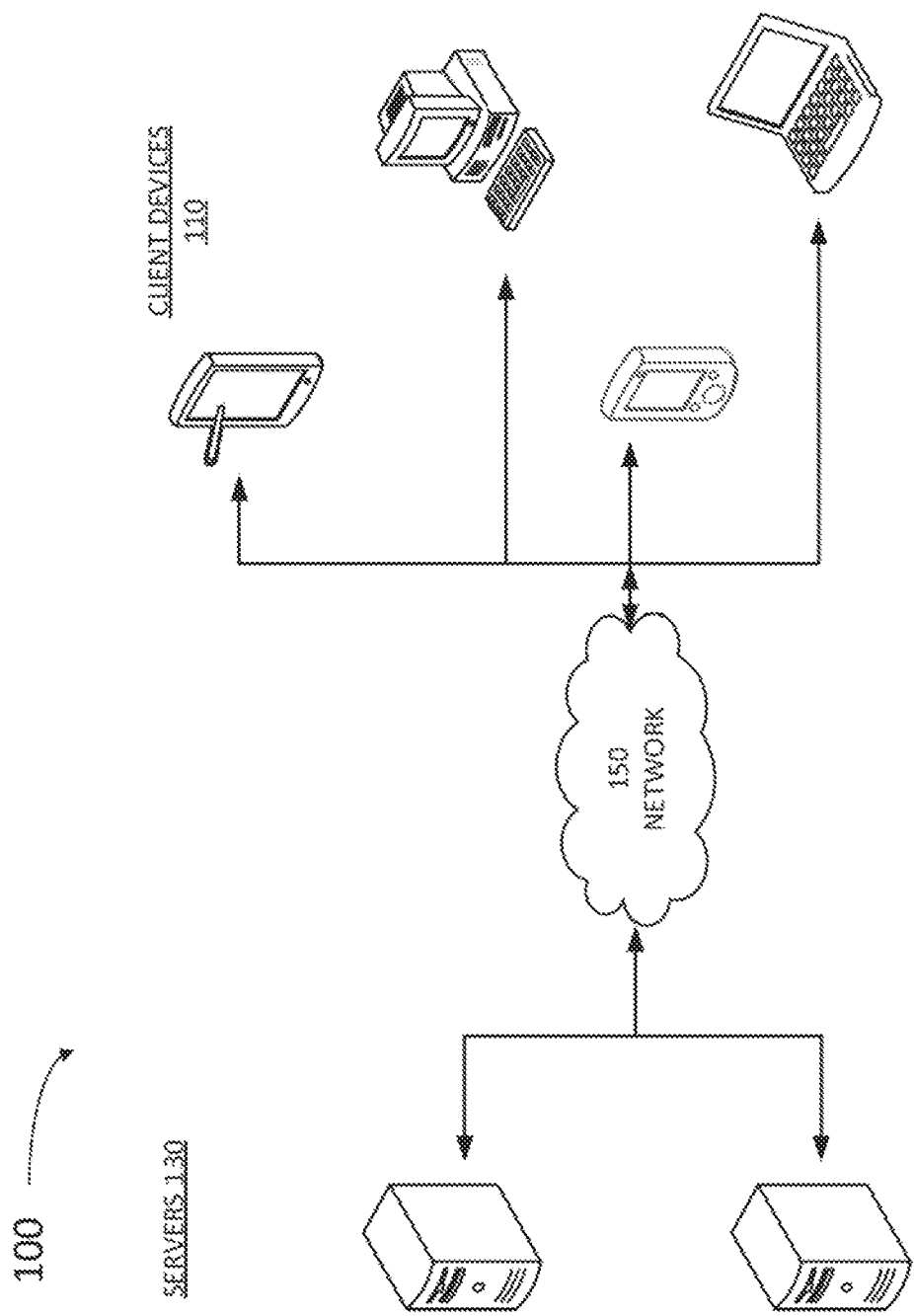
FIG. 1 illustrates an example architecture suitable for providing autolinking of hierarchies, according to some embodiments of the subject technology.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

As used herein, the term "hierarchy" may be used, for example, in reference to DOM-like (document object model) tree structure, where there is a single root node and each node may contain any number of children nodes. The term "layer" may be used, for example, in reference to a node in a hierarchy. Thus, a hierarchy can include one or more layers that define different properties for a graphical representation of a user interface. The terms "asset" and "digital asset" can refer to digital content, which can include an image, a video, an animation, or an audio recording, or is composed of one or more types of digital content (text, fonts, image, video, animation, audio, etc.).

The present disclosure relates to automatically linking layers between different hierarchies to facilitate an animation that transitions from at least one layer in a first hierarchy to at least one second layer in a second hierarchy.

Embodiments as disclosed herein provide a solution to the problem arising in the realm of computer technology for linking between separate hierarchical structures to facilitate performing an animation between the hierarchical structures. Tools as disclosed herein provide for smoothly transitioning between any two arbitrary hierarchies and provide a way for users to customize the detail of each transition. These tools therefore enable a user to do less work while still allowing the user to individually customize the transition and order.

The subject system provides several advantages, including a feature for the automated creation of transitions between two hierarchies and order of the transition hierarchy using autolinking and/or merging techniques described herein. The proposed solution further provides improvements to the functioning of the computer itself, because it can reduce processing time for linking between different hierarchies as the techniques described herein improve the efficiency of handling duplicate names and/or differences in parent-child node relationships, and can improve scalability of the system as hierarchies increase in size over time. Additionally, the subject system decreases a burden on a computer processor, network hardware and resources, and/or device power for displaying complex animations that may be executed by the system because the automated autolinking and merging techniques can provide efficiencies across one or more components of the system, resulting in improvements that may be realized in an observable manner.

Embodiments disclosed herein further include tools for providing complex and smooth animations, using the linking and/or merging techniques described herein, in connection with receiving one or more interactions within representations of graphical user interfaces.

Example System Architecture

FIG. 1 illustrates an example architecture 100 for providing autolinking and merging of hierarchies suitable for practicing some implementations of the disclosure. Architecture 100 includes servers 130 and client devices 110 connected over a network 150. One of the many servers 130 is configured to host a memory including instructions which, when executed by a processor, cause the server 130 to perform at least some of the steps in methods as disclosed herein. For purposes of load balancing, multiple servers 130 can host memories including instructions to one or more processors. Servers 130 may include any device having an appropriate processor, memory, and communications capability for hosting an asset manager and an asset database. The asset manager, which facilitates access to the asset database, may be accessible by various clients 110 over the network 150.

Client devices 110 can be, for example, desktop computers, mobile computers, tablet computers (e.g., including e-book readers), mobile devices (e.g., a smartphone or PDA), or any other device having appropriate processor, memory, and communications capabilities for accessing the image search engine and the history log on one or more of servers 130. In some embodiments, the processor in a client device 110 is configured to provide autolinking and merging of hierarchies to facilitate executing an animation created by a user of client device 110.

Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
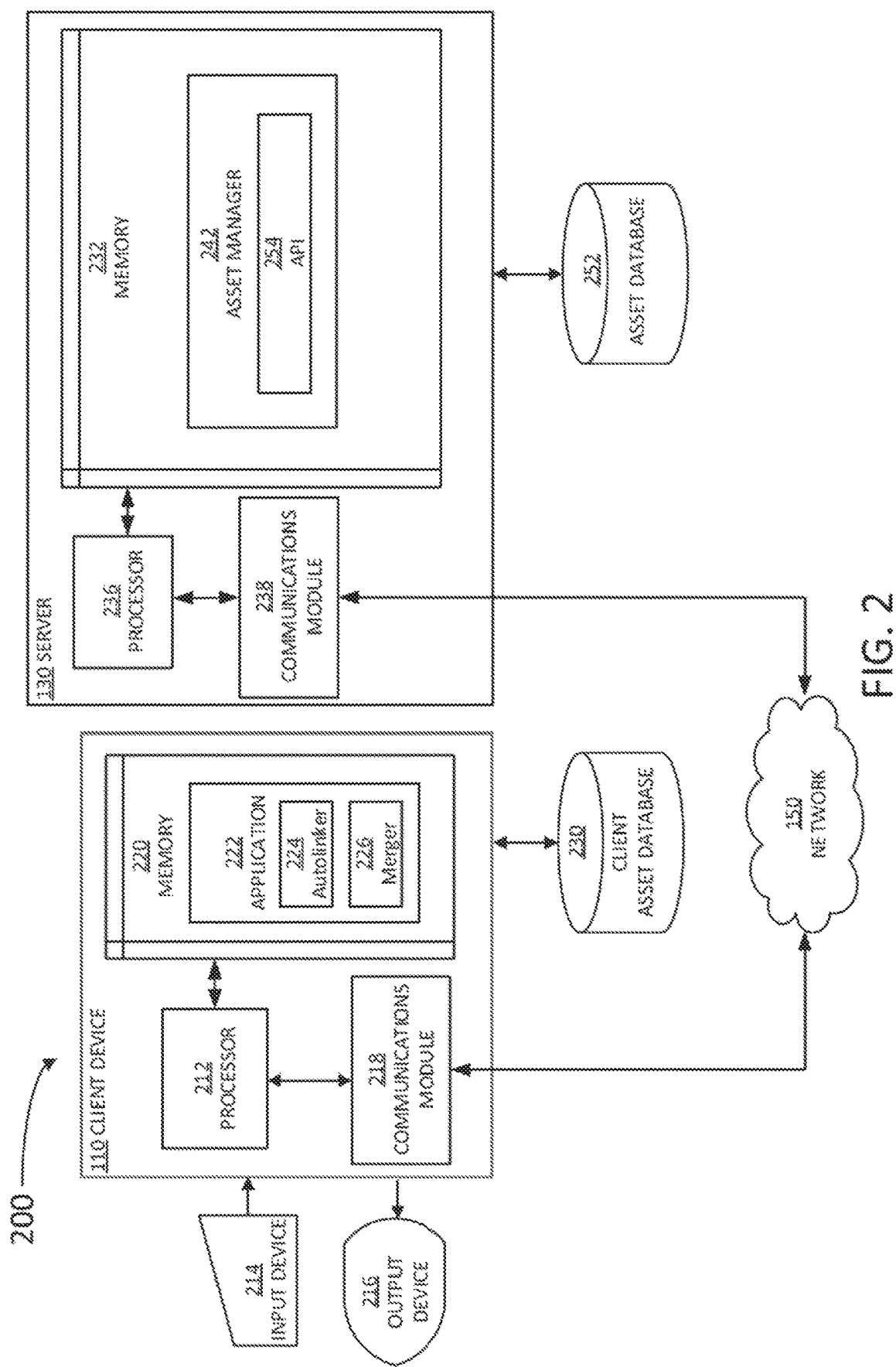
FIG. 2 is a block diagram illustrating an example server and client from the architecture of FIG. 1, according to some embodiments of the subject technology.

FIG. 2 is a block diagram 200 illustrating an example server 130 and client device 110 in the architecture 100 of FIG. 1, according to certain aspects of the disclosure. Client device 110 and server 130 are communicatively coupled over network 150 via respective communications modules 218 and 238. Communications modules 218 and 238 are configured to interface with network 150 to send and receive information, such as data, requests, responses, and commands to other devices on the network. Communications modules 218 and 238 can be, for example, modems or Ethernet cards.

Server 130 includes a memory 232, a processor 236, and communications module 238. Processor 236 is configured to execute instructions, such as instructions physically coded into processor 236, instructions received from software in memory 232, or a combination of both. Memory 232 includes an asset manager 242 for accessing assets stored in an asset database 252.

A user may access asset manager 242 through an application 222 included in memory 220 of client device 110. The application 222 may be configured to make one or more calls to an API 254 provided by asset manager 242 to send requests and receive responses to such requests from the asset manager 242. Execution of application 222 may be controlled by a processor 212 in client device 110. Application 222 may further include an autolinker 224 for linking between different hierarchies, and merger 226 for merging different hierarchies according to techniques described herein. Examples of autolinking are discussed in more detail in FIGS. 7-11 below, and examples of merging are discussed in further detail in FIGS. 12 and 13 below. Application 222 may execute animations based at least in part on the linked and/or merged hierarchies as described further herein. Application 222 may access client asset database 230, which stores a dataset associated with digital content, which can include an image, a video, an animation, or an audio recording, or is composed of one or more types of digital content (text, fonts, image, video, animation, audio, etc.).

Similar to client asset database 230, the asset database 252 can be, for example, a dataset associated with digital content, which can include an image, a video, or an audio recording, or is composed of one or more types of digital content (text, fonts, image, video, animation, audio, etc.), which may be accessed by asset manager 242 and/or application 222.

The asset manager 242 and the asset database 252 may be part of the same memory 232 in server 130. In some embodiments, the asset manager 242 and/or the asset database 252 may be hosted in a different server that is accessible by server 130.

Figure 3:
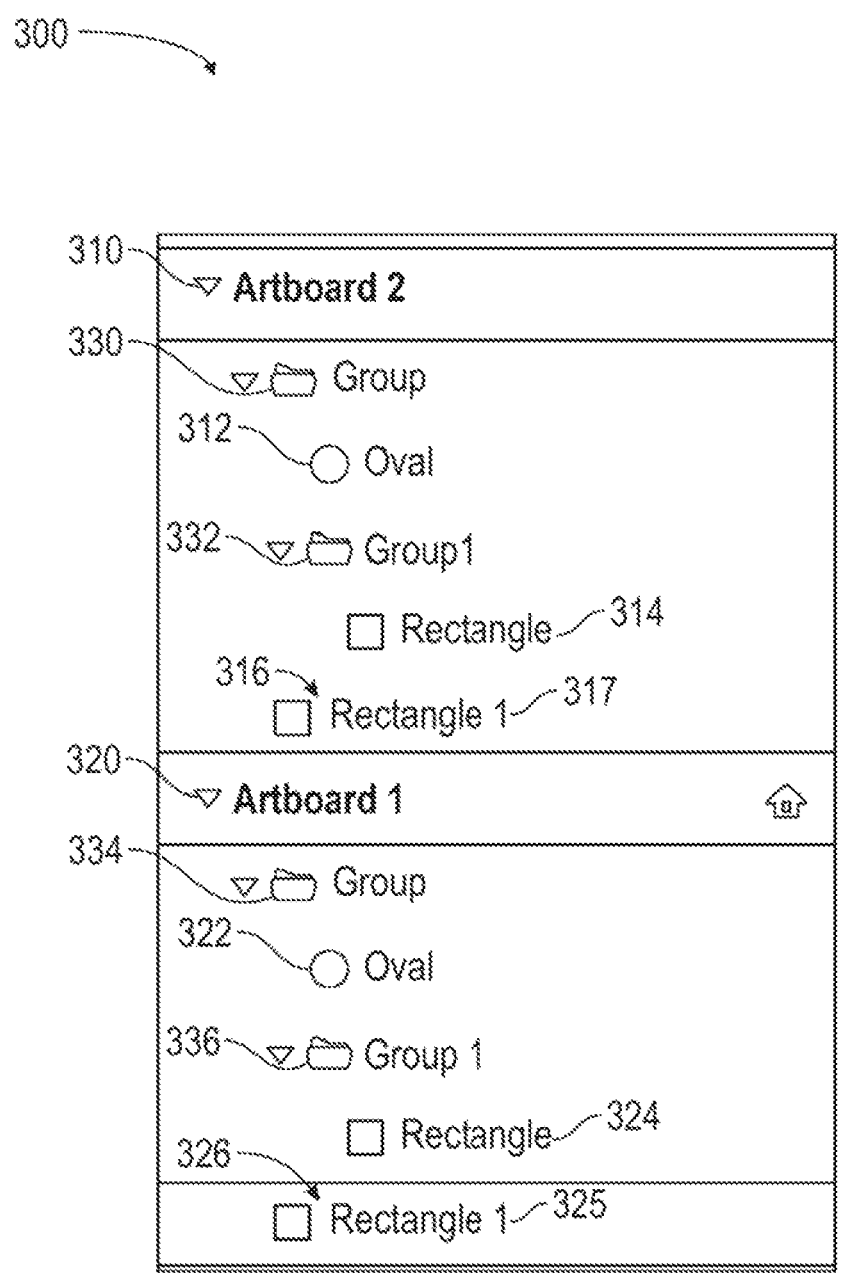
FIG. 3 illustrates a graphical interface of an application providing graphical representations of two different hierarchies, in accordance with embodiments of the subject technology.

FIG. 3 illustrates a graphical interface 300 ("interface") of an application (e.g., the application 222), providing graphical representations of two different hierarchies in accordance with embodiments of the subject technology. In an example, the application may provide information from the client asset database 230 and/or the asset database 252 for display in the interface 300.

As illustrated, the interface 300 includes graphical representations of a hierarchy 310 and a hierarchy 320. The hierarchy 310 ("Artboard 2") includes a layer 330 ("Group"), layer 332 ("Group 1"), and layer 316. Layer 330 includes a child node 312 ("Oval"), and layer 332 is considered a layer below the layer 330. Layer 332 includes a child node 314 ("Rectangle"), and layer 316 is illustrated as only including one node 317 (e.g., corresponding to "Rectangle 1"). The hierarchy 320 ("Artboard 1") includes a layer 334 ("Group"), layer 336 ("Group 1"), and layer 326. Layer 336 may be considered a layer below the layer 334, and layer 326 is illustrated as having no child nodes and including one node 325 (corresponding to "Rectangle 1"). As further shown in the interface 300, one or more layers may be included in a respective group, such as layer 330 included in group 330, and layer 332 included in group 332. Further, layer 334 is included in group 334, and layer 336 is included in group 336.

In one or more embodiments, child nodes in a given hierarchy are ordered by z-index. As used herein, the term "z-index" refers to a property that can be specified with an integer value (positive, zero, or negative), which represents a position of an element along a z-axis. Layers of given hierarchy may be organized as a stack of layers, where each layer is assigned to a number representing the z-index. In an embodiment, layers with a higher z-index display on top of layers with a lower z-index. Child nodes have a higher z-index than their parent node(s), such that child nodes display on top of parent nodes. Further, within a hierarchy, no two nodes have the same z-index, meaning nodes within a hierarchy are totally ordered.

In one or more embodiments, each layer in a hierarchy has at least the following properties: 1) a name, 2) a universally unique ID (UUID), 3) a type, and 4) arbitrary properties based on type.

Figure 4:
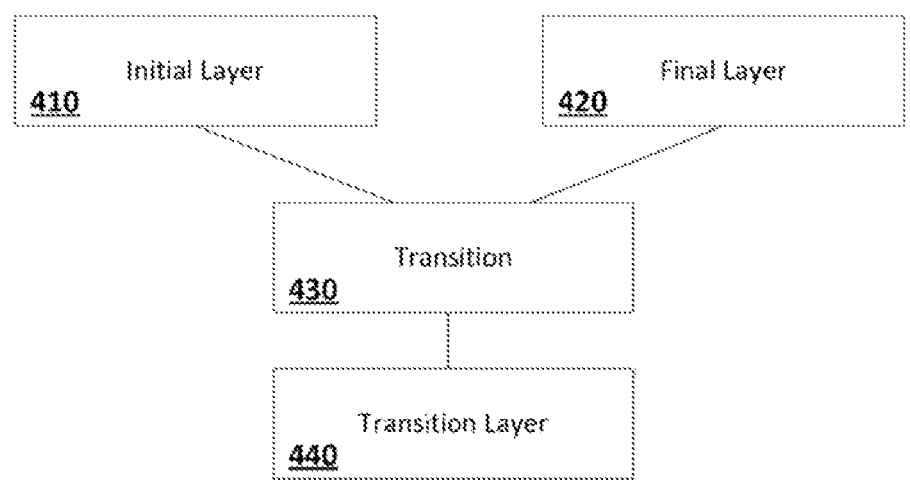
FIG. 4 conceptually illustrates relationships between layers and transitions, in accordance with embodiments of the subject technology.

FIG. 4 conceptually illustrates relationships 400 between layers and transitions, in accordance with embodiments of the subject technology. As illustrated, the relationships 400 include an initial layer 410, a transition 430, a transition layer 440, and a final layer 420. Each of the respective layers shown in FIG. 4 corresponds to a respective hierarchy.

The term "transition," as used herein, refers to a specification of a layer's 1) type, 2) initial properties, 3) final properties, and 4) timing and easing of the changes between initial and final properties, including delays and durations.

In one or more embodiments, an animation includes a set of transitions between an initial hierarchy (e.g., corresponding to initial layer 410) and a final hierarchy (e.g., corresponding to final layer 420) as well as a hierarchy (referred to as a transition hierarchy) where each transition maps to a single node. In an animation, every layer in the initial hierarchy (e.g., corresponding to initial layer 410) and the final hierarchy (e.g., corresponding to final layer 420) maps to a transition (e.g., the transition 430). In an example, a transition (e.g., transition 430) may map to at most one layer in each hierarchy (e.g., the initial layer 410 and final layer 420), and maps to at least one layer.

In a transition (e.g., the transition 430), initial and/or final properties may be determined by the layers (e.g., the layers 410 and 420) mapping to that transition instead of the properties being defined by the transition itself. If the transition maps to a layer in the initial hierarchy (e.g., corresponding to initial layer 410), the transition's initial properties are defined by the node's properties (e.g., the layer 410). Similarly, if the transition maps to a layer in the final hierarchy (e.g., corresponding to final layer 420), then the final properties of its transition are defined by the final layer's properties.

In one or more embodiments, a transition's type is required to be the same as one of the layers that the transition is mapped to. Since the properties supported by a layer change depend on the type, only the properties of the chosen type may be set on the transition's properties.

In one or more embodiments, if a transition (e.g., the transition 430) maps to two layers (e.g., the layers 410 and 420), the initial and final properties are defined by the mapped layers. In an example, an exception occurs if the initial and final layers have different types. In this case, if the initial or final layer does not have properties included with the transition's type, those missing properties may be set. In an example, these properties do not override properties in the mapped layer, but supplement the properties in the mapped layer.

In one or more embodiments, the execution of an animation performs the following steps: 1) displaying the initial hierarchy, 2) replacing the initial hierarchy with the transition hierarchy with all layers set to initial properties, 3) transitioning from initial properties to final properties over time for each layer, and 4) replacing the transition hierarchy with the final hierarchy.

In one or more embodiments, an animation is triggered for execution by an interaction (e.g., a user input corresponding to a touch input, touch gesture, keyboard input, mouse input, voice input, etc.). In an example, for some interactions such as a swipe, a single gesture may trigger multiple animations.

Figure 5:
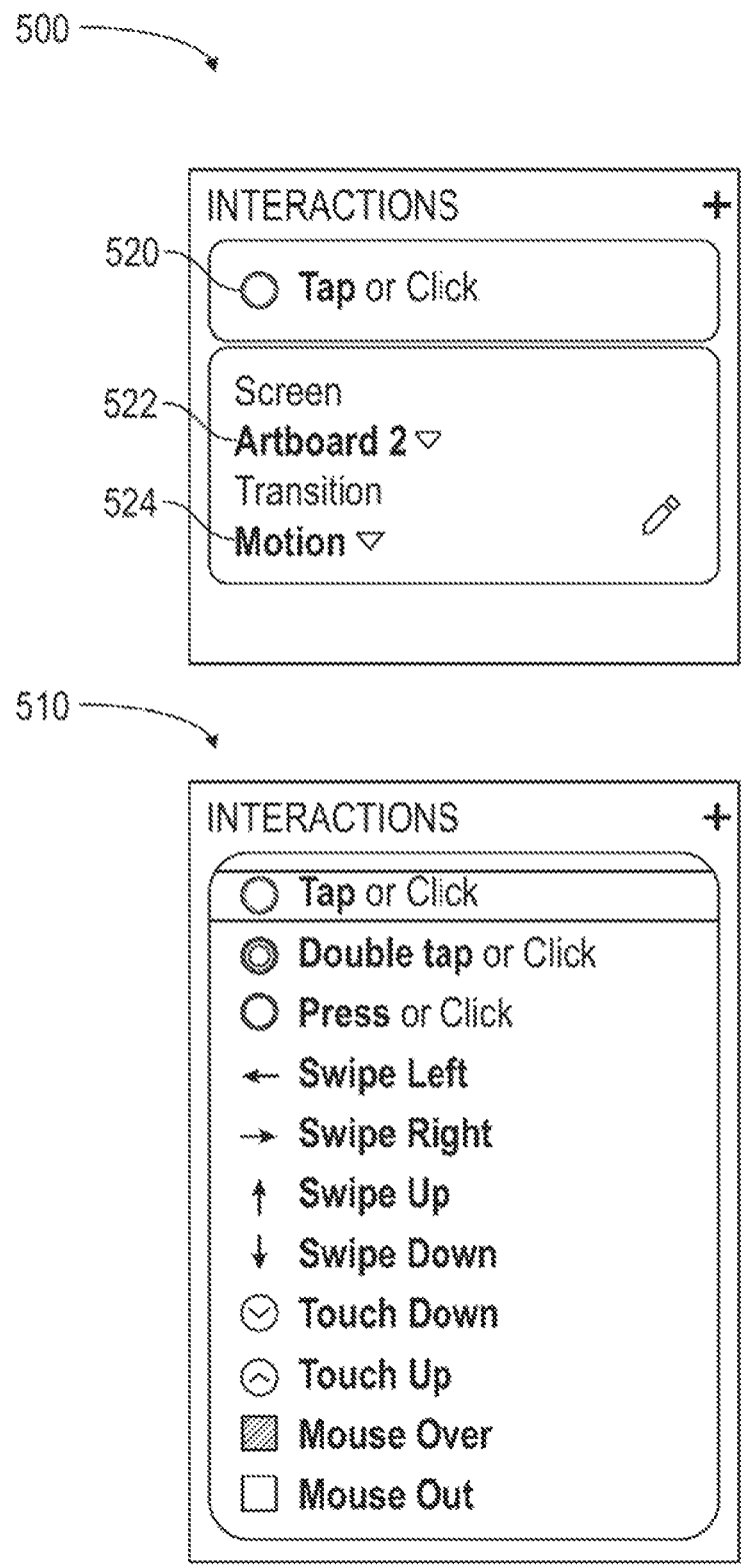
FIG. 5 illustrates a graphical interface for defining an interaction, and a graphical interface for triggering an interaction, of an application, in accordance with embodiments of the subject technology.

FIG. 5 illustrates graphical interface 500 ("interface") for defining an interaction, and graphical interface 510 ("interface") for triggering an interaction, of an application (e.g., the application 222), in accordance with embodiments of the subject technology.

As illustrated, the interface 500 includes a graphical element 520 for setting an interaction, a graphical element 522 for setting a screen, and a graphical element for setting a transition 524. The interface 510 includes a listing of different interactions, which may be subsequently selected after the graphical element 520 has been selected.

FIG. 6 illustrates graphical interface 600 ("interface") for specifying a custom animation curve to transition between changing properties and graphical interface 650 for using predefined common curves.

As illustrated, the interface 600 includes a graphical element 620 that may be selected to accept input to specify a custom animation curve for a single property. The interface 650, as shown, includes different selectable predefined common curves for the animation.

The aforementioned techniques in connection with embodiments of an animation of the subject technology can provide several advantages. For example, the subject technology enables smoothly transitioning between any two arbitrary hierarchies and provides an easy way for users to customize the behavior of each transition. In addition, multiple transitions may be defined between any two hierarchies and reused for different interactions between two states. Also, users interact with and change transition properties in the same way that layers are updated, lowering the barrier to entry. Further, multiple sequential animations may be triggered by a single interaction, enabling users to create smooth and complex animations.

In one or more embodiments, two respective nodes are linked if both nodes map to the same transition. If a particular node includes its own transition, this particular node is considered to be unlinked. As used herein, the term "link" refers to a transition that maps to two layers.

As used herein, the term "build-out" refers to the transition for an unlinked node in the initial hierarchy. In a build-out transition, the default final properties are the same as the initial properties, except opacity is set to a value of zero. When executing an animation, this fades out the layer. A user may change any property of a layer in a build-out, which in turn sets the final properties of the transition.

As used herein, the term "build-in" is the transition for an unlinked node in the final hierarchy. In a build-in transition, the default initial properties are the same as the initial properties, except opacity is set to a value of zero. When executing an animation, this fades in the layer. A user may change any property of a build-in, which in turn sets the initial properties of the transition.

In one or more embodiments, build-ins and build-outs are lazily defined. For example, if the build-ins and build-outs are not edited and include the default opacity fade, then the build-ins and build-outs are defined while animating rather than cluttering up the data model. In an embodiment, all unlinked layers have a build-in, but a transition is only created if properties or timing is changed.

As used herein, the term "autolinking" refers to an automated process of determining which nodes in the hierarchies are to be linked without requiring any user intervention. In one or more embodiments, a name, ordinal, and type of each node may be utilized to determine the user's intention and create all the transitions for an animation.

Embodiments of the subject technology provide techniques for performing autolinking, which has the following advantages: 1) allowing duplicate named layers and linking by ordinal, which is more natural to designers and allows them to stay in the flow while still having the desired outcome, 2) iteratively running to forgo manually linking layers, 3) maintaining links and corresponding potentially customized transitions, 4) taking into account manual linking and unlinking allows users to have differently nested hierarchies yet still benefiting from autolinking, 5) enabling developers to develop an intuition and better leverage autolinking, and 6) enabling linking between any two types, which provides further flexibility for designers.

In the following examples of the autolinking process of embodiments described herein, the following format is used to describe a node: type([propertyName: propertyValue]). Additionally, indenting a node indicates that the indented node is the child of a prior less indented parent node.

Figure 7:
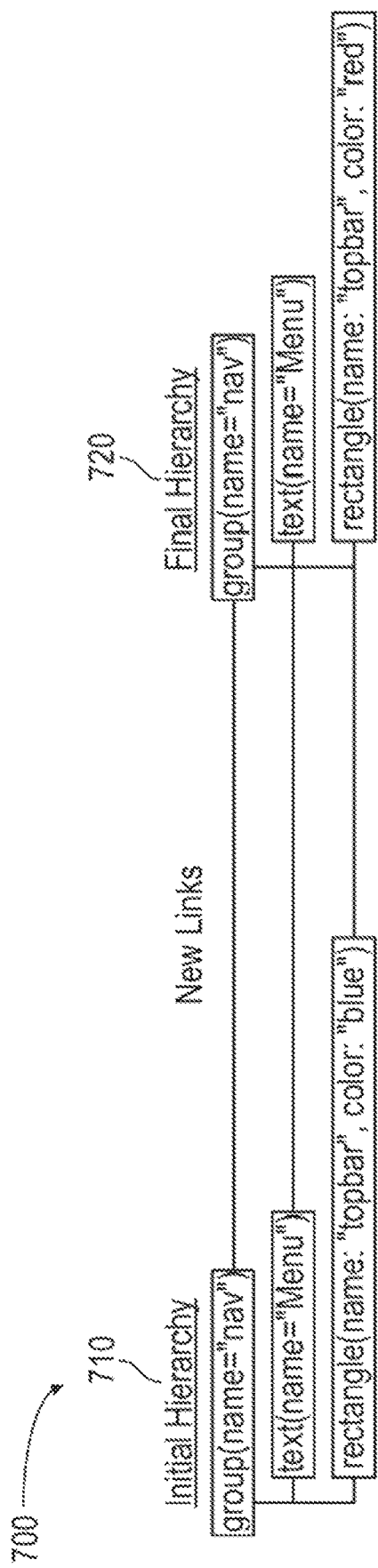
FIG. 7 conceptually illustrates a logical diagram of autolinking with exactly similar hierarchies, in accordance with some embodiments of the subject technology.

FIG. 7 conceptually illustrates logical diagram 700 of autolinking with exactly similar hierarchies, in accordance with some embodiments of the subject technology.

As illustrated, an initial hierarchy 710 and a final hierarchy 720 are included. In the example of FIG. 7, respective parent nodes (e.g., corresponding to "group(name='nav')") are linked in the initial hierarchy 710 and the final hierarchy 720, and corresponding child nodes have the same names ("Menu" and "topbar"). Consequently, the corresponding child nodes are linked when the child nodes have the same names and the groups (e.g., parent nodes) are also linked as a result of autolinking.

FIG. 8A conceptually illustrates logical diagram 800 of autolinking with unmatched layers, in accordance with some embodiments of the subject technology.

As illustrated, an initial hierarchy 810 and a final hierarchy 820 are included. In the example of FIG. 8A, respective layers (e.g., corresponding to "group(name='nav')") are linked in the initial hierarchy 810 and the final hierarchy 820. Respective layers (e.g., corresponding to "group (name='menu')") are linked in the initial hierarchy 810 and the final hierarchy 820. Consequently, groups with a different path to a linked node will not match and are not linked, even if both layers have the same name. Nodes with different names do not match and are not linked as shown in FIG. 8A.

FIG. 8B conceptually illustrates logical diagram 850 of autolinking with pre-existing links, in accordance with some embodiments of the subject technology.

As illustrated, an initial hierarchy 830 and a final hierarchy 840 are included. In the example of FIG. 81B, respective layers with nodes 852 and 854 (e.g., corresponding to "group(name='menu')" and "group(name='submenu')") have a pre-existing link (e.g., before autolinking takes place) in the initial hierarchy 830 and the final hierarchy 840. During autolinking, respective root layers (e.g., corresponding to "group(name='nav')") are linked in the initial hierarchy 830 and the final hierarchy 840. Matching child nodes with the same names from the initial hierarchy 830 and the final hierarchy 840 are linked during autolinking. Consequently, in this example, if two respective nodes are already linked before the autolinking begins, similar nodes with the same names will be linked as a result of autolinking. Further, the root of the two hierarchies are linked as a result of autolinking as shown in FIG. 8B. For example, nodes 842 and 844 are linked, and nodes 846 and 848 are linked after autolinking has been performed.

Figure 9A:
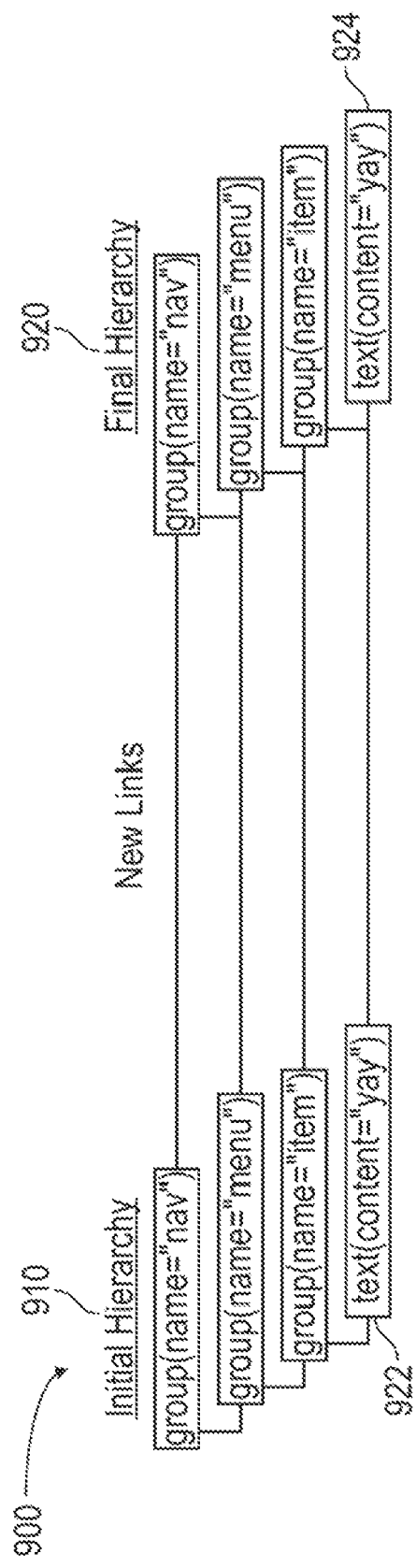
FIG. 9A conceptually illustrates a logical diagram of autolinking with matching unnamed text nodes, in accordance with some embodiments of the subject technology.

FIG. 9A conceptually illustrates logical diagram 900 of autolinking with matching unnamed text nodes, in accordance with some embodiments of the subject technology.

As illustrated, an initial hierarchy 910 and a final hierarchy 920 are included. In the example of FIG. 9A, respective layers (e.g., corresponding to the different "group" nodes) in the initial hierarchy 910 and the final hierarchy 920 are linked when the corresponding nodes have matching names. During autolinking, in addition to name matching, corresponding nodes from the initial hierarchy 910 and the final hierarchy 920 are linked if both nodes' name is unset (e.g., no name property), type is equal to text, and the text content is the same (e.g., "content='yay')"). For example, nodes 922 and 924 are linked after autolinking has been performed.

Figure 9B:
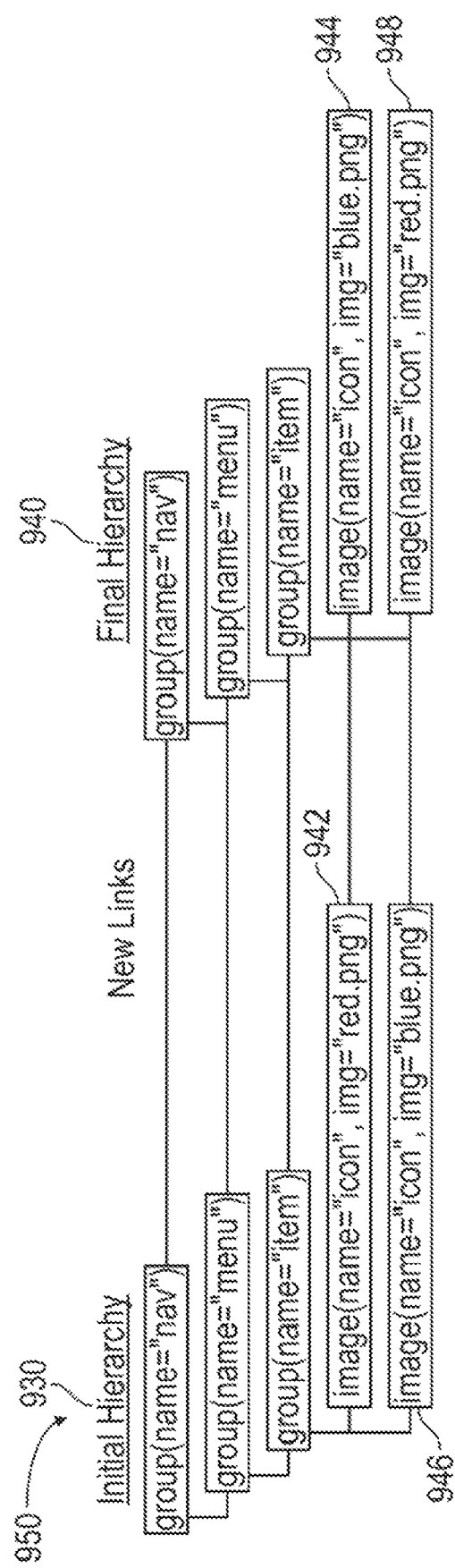
FIG. 9B conceptually illustrates a logical diagram of autolinking with duplicate names, in accordance with some embodiments of the subject technology.

FIG. 9B conceptually illustrates logical diagram 950 of autolinking with duplicate names, in accordance with some embodiments of the subject technology.

As illustrated, an initial hierarchy 930 and a final hierarchy 940 are included. In the example of FIG. 9B, respective layers (e.g., corresponding to the different "group" nodes) in the initial hierarchy 930 and the final hierarchy 940 are linked when the corresponding nodes have matching names. During autolinking, in addition to name matching, corresponding child nodes with matching names and/or content from the initial hierarchy 930 and the final hierarchy 940 are linked if the child nodes each have parent nodes with the same names (e.g., corresponding to "group(name='item')"). Consequently, if two corresponding nodes with the same parent node also have the same name (or content), the two nodes are linked by ordinal (e.g., 1st, 2nd, 3rd), as shown in FIG. 9B. For example, nodes 942 and 944 are linked, and nodes 946 and 948 are linked after autolinking has been performed.

Figures 10A, 10B:
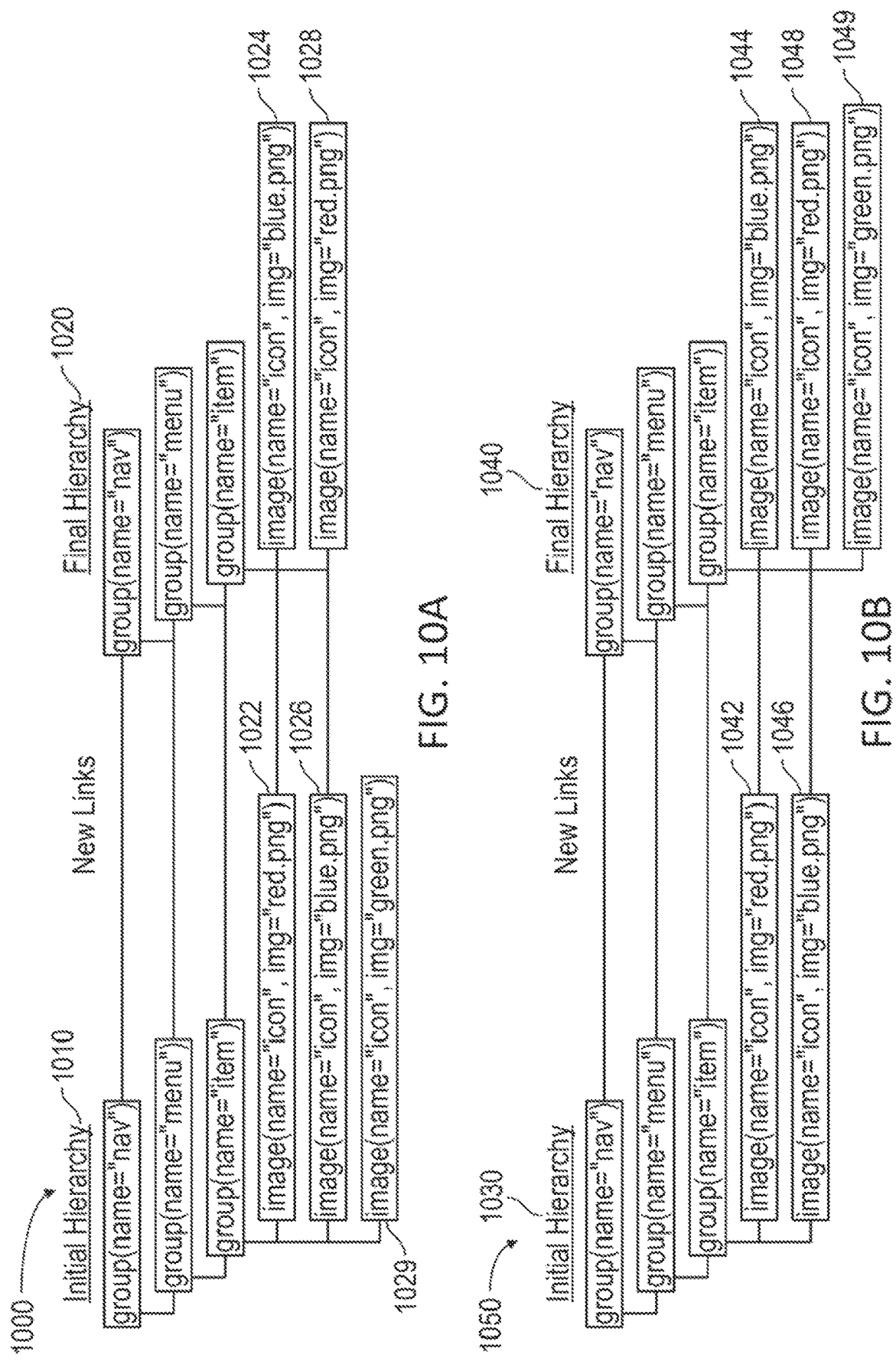
FIG. 10A conceptually illustrates a logical diagram of autolinking with unbalanced duplicate names in a final hierarchy, in accordance with some embodiments of the subject technology.
FIG. 10B conceptually illustrates a logical diagram of autolinking with unbalanced duplicate names in an initial hierarchy, in accordance with some embodiments of the subject technology.

FIG. 10A conceptually illustrates logical diagram 1000 of autolinking with unbalanced duplicate names in a final hierarchy, in accordance with some embodiments of the subject technology.

As illustrated, an initial hierarchy 1010 and a final hierarchy 1020 are included. In the example of FIG. 10A, respective layers (e.g., corresponding to the different "group" nodes) in the initial hierarchy 1010 and the final hierarchy 1020 are linked when the corresponding nodes have matching names. During autolinking, in addition to name matching, corresponding child nodes with matching names and/or content from the initial hierarchy 1010 and the final hierarchy 1020 are linked if the child nodes each have parent nodes with the same names (e.g., corresponding to "group(name='item')"). However, a child node (e.g., "image(name='icon', img='green.png')") in the initial hierarchy 1030 without a matching child node in the final hierarchy 1020 is not linked. Consequently, if there are duplicate names, but more of one name is in the initial hierarchy 1010, only the first matching duplicates are linked as shown in FIG. 10A. For example, nodes 1022 and 1024 are linked, and nodes 1026 and 1028 are linked after autolinking has been performed. Further, node 1029 is not linked.

FIG. 10B conceptually illustrates logical diagram 1050 of autolinking with unbalanced duplicate names in an initial hierarchy, in accordance with some embodiments of the subject technology.

As illustrated, an initial hierarchy 1030 and a final hierarchy 1040 are included. In the example of FIG. 10B, respective layers (e.g., corresponding to the different "group" nodes) in the initial hierarchy 1030 and the final hierarchy 1040 are linked when the corresponding nodes have matching names. During autolinking, in addition to name matching, corresponding child nodes with matching names and/or content from the initial hierarchy 1030 and the final hierarchy 1040 are linked if the child nodes each have parent nodes with the same names (e.g., corresponding to "group(name='item')"). However, a child node (e.g., "image(name='icon', img='green.png')") in the final hierarchy 1040 without a matching child node in the initial hierarchy 1030 is not linked. Consequently, if there are duplicate names, but more of one name is in the final hierarchy 1040, only the first matching duplicates are linked as shown in FIG. 10B. For example, nodes 1042 and 1044 are linked, and nodes 1046 and 1048 are linked after autolinking has been performed. Further, node 1049 is not linked.

Figure 11:
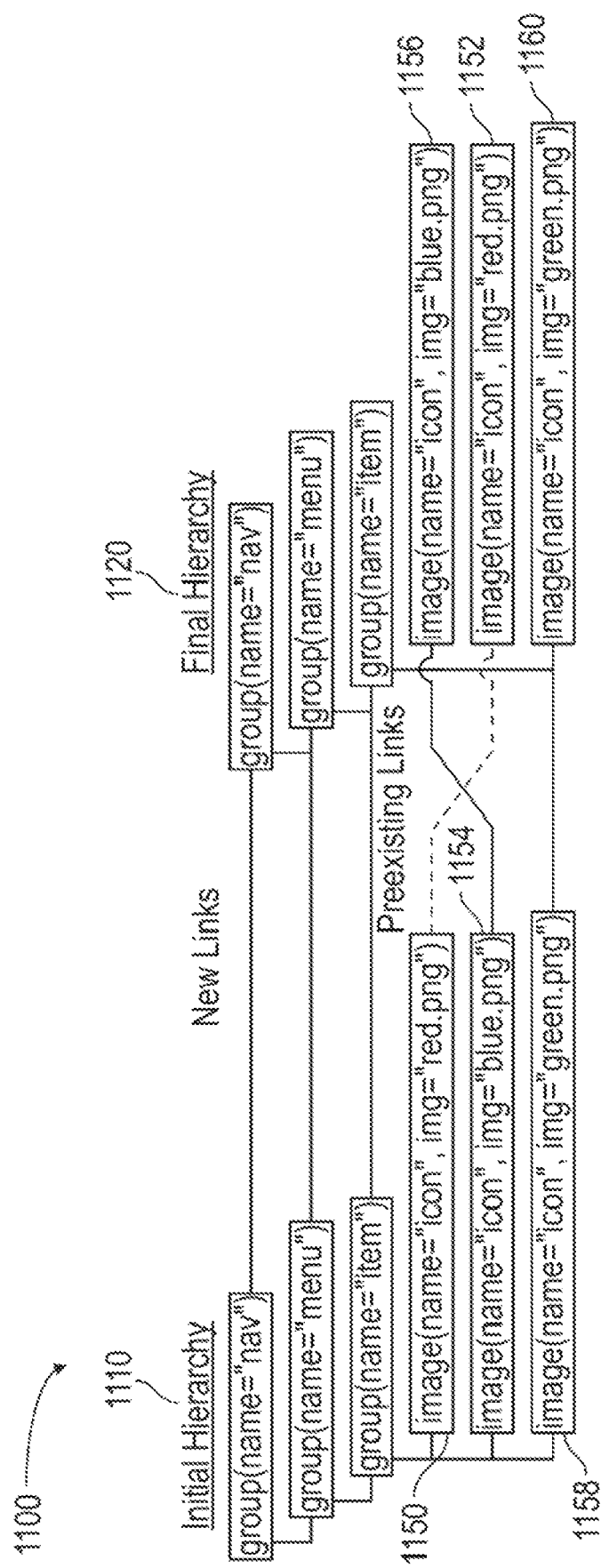
FIG. 11 conceptually illustrates a logical diagram of autolinking with duplicate names and pre-existing links, in accordance with some embodiments of the subject technology.

FIG. 11 conceptually illustrates logical diagram 1100 of autolinking with duplicate names and preexisting links, in accordance with some embodiments of the subject technology.

As illustrated, an initial hierarchy 1110 and a final hierarchy 1120 are included. In the example of FIG. 11, respective nodes 1150 and 1152 have a pre-existing link (e.g., before autolinking takes place) in the initial hierarchy 1110 and the final hierarchy 1120. Consequently, if duplicate layers are linked before autolinking, the respective layers with nodes 1150 and 1152 are ignored during autolinking.

In the example of FIG. 11, respective layers (e.g., corresponding to the different "group" nodes) in the initial hierarchy 1110 and the final hierarchy 1120 are linked when the corresponding nodes have matching names. Since nodes 1150 and 1152 are ignored during autolinking, nodes 1154 and 1156 are linked, and nodes 1158 and 1160 are linked after autolinking has been performed.

Embodiments of the subject technology provide a merging process to automatically determine the order of layers in the transition hierarchy. This merging process leverages the collection of links to determine the "best" transition hierarchy.

Embodiments of the subject technology provide techniques for performing a merging process to automatically determine the order of layers in the transition hierarchy, which has the following advantages: 1) users can manually reorder layers based on a different preference, 2) facilitates development of an intuition for merging behavior by users, 3) enables consistent behavior from the merging process if there is a truly optimal choice, 4) enables scalability as the size of datasets increase, and 5) placing build-ins on top of build-outs to align with a designer's general intention that incoming layers come in over outgoing ones.

Figure 12:
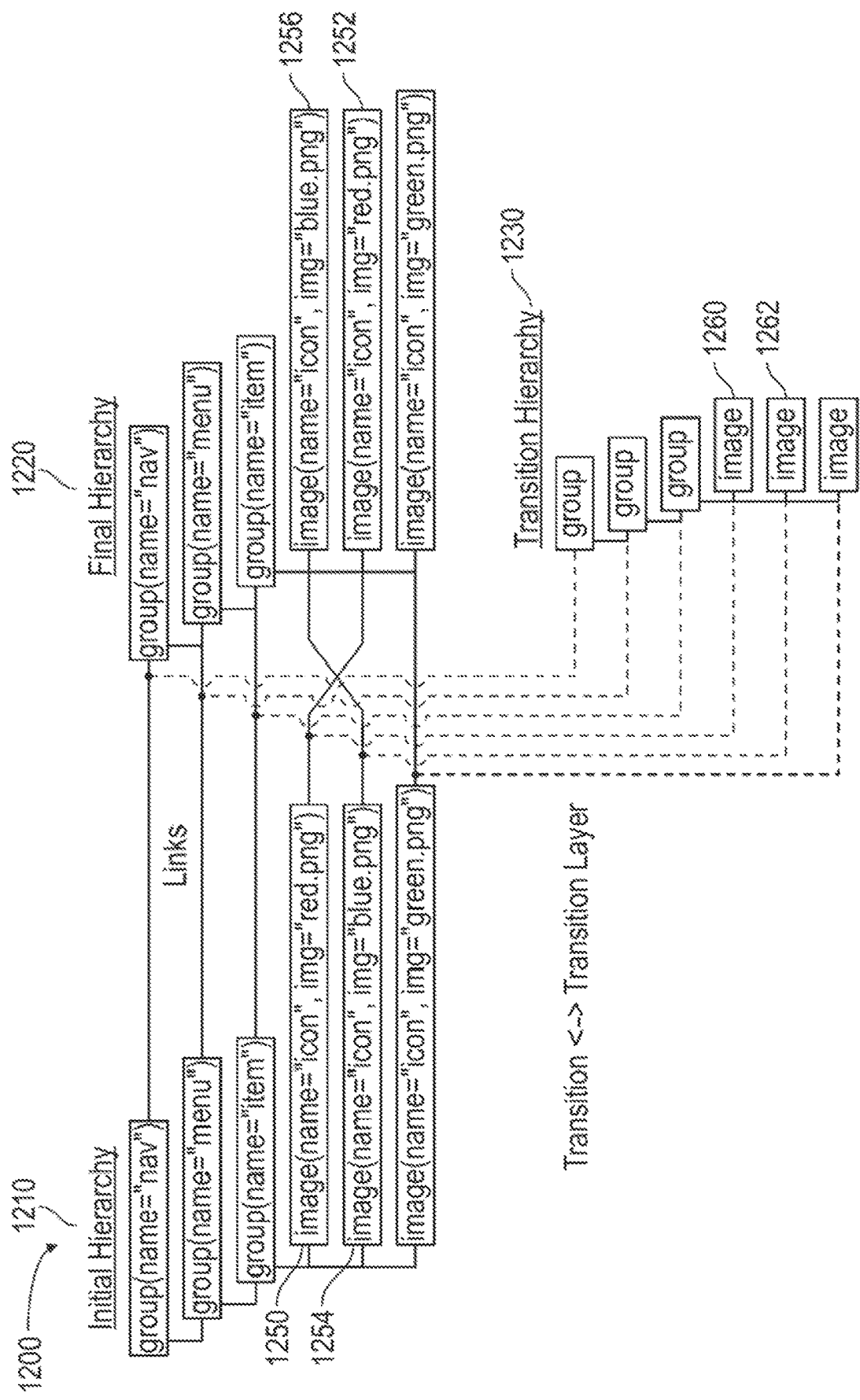
FIG. 12 conceptually illustrates a logical diagram of a transition hierarchy generated from two hierarchies and associated links, in accordance with some embodiments of the subject technology.

FIG. 12 conceptually illustrates logical diagram 1200 of a transition hierarchy generated from two hierarchies and associated links, in accordance with some embodiments of the subject technology.

In an example where links are crisscrossed between the initial and final hierarchy, the merging process determines which links should precede the other links. In some embodiments, the merging process may be biased towards the structure of the initial hierarchy over the final hierarchy. When generating a transition hierarchy, all transition layers that correspond to a layer in the initial hierarchy have the same ordering and path in the transition hierarchy as the corresponding layers in the initial hierarchy. This provides a smooth animation from the initial hierarchy to the transition hierarchy. In some embodiments, a jagged transition may result as layers change z-index when the final hierarchy replaces the transition hierarchy.

As illustrated in the example of FIG. 12, a transition hierarchy 1230 is generated based on an initial hierarchy 1210 and a final hierarchy 1220. Nodes 1250 and 1252 are linked, and nodes 1254 and 1256 are linked, which result in the links being crisscrossed between the initial hierarchy 1210 and final hierarchy 1220. In the transition hierarchy 1230, the merging process links node 1260 to nodes 1250 and 1252 from the initial hierarchy 1210 and final hierarchy 1220, and links node 1262 to nodes 1254 and 1256 from the initial hierarchy 1210 and final hierarchy 1220, respectively.

Figure 13:
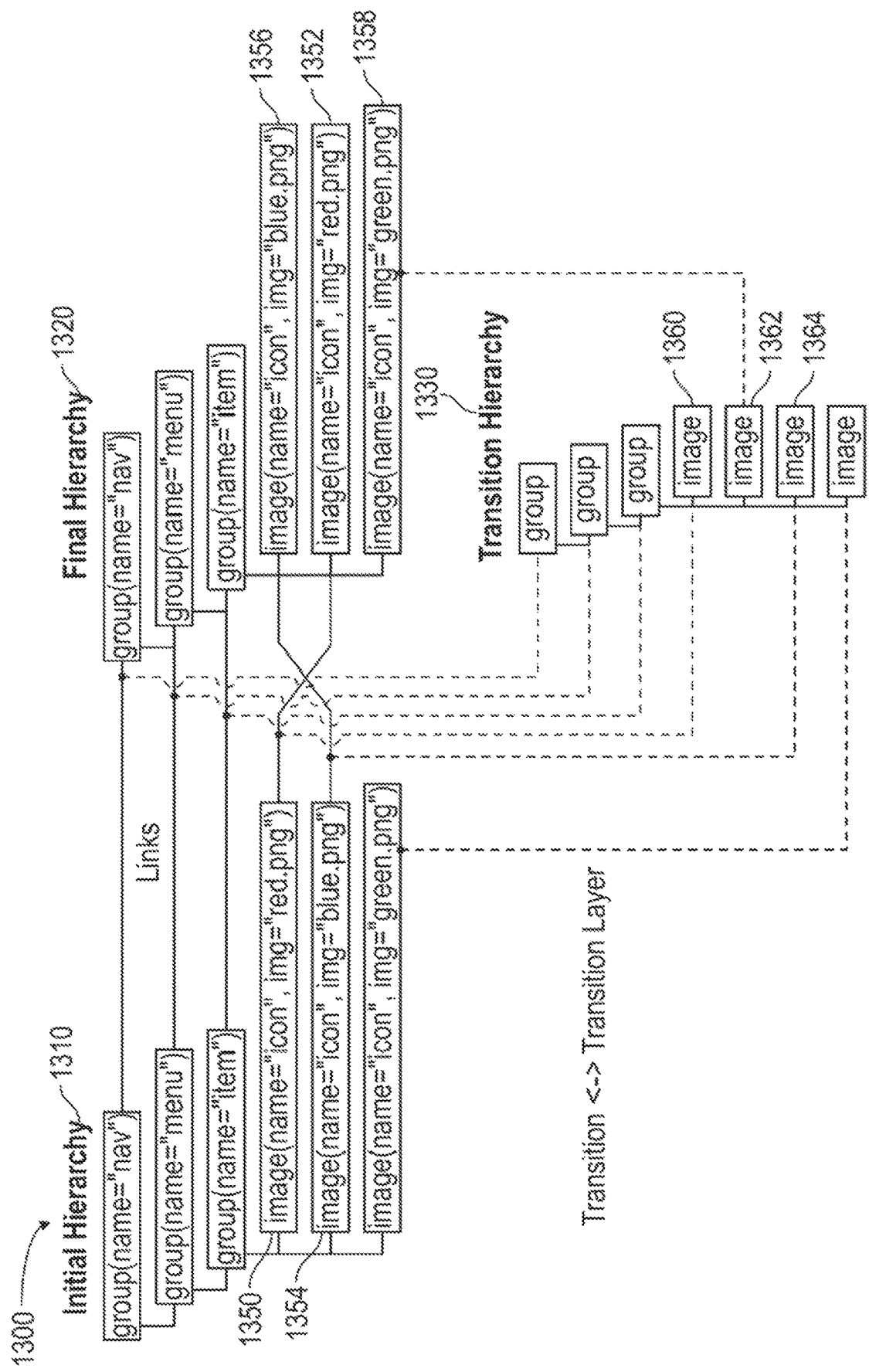
FIG. 13 conceptually illustrates a logical diagram of a transition hierarchy generated from two hierarchies and associated links, in accordance with some embodiments of the subject technology.

FIG. 13 conceptually illustrates logical diagram 1300 of a transition hierarchy generated from two hierarchies and associated links, in accordance with some embodiments of the subject technology.

In some embodiments, unlinked layers in the initial hierarchy correspond to build-outs. Build-outs are placed in the same place relative to every other layer in the initial hierarchy. Unlinked layers in the final hierarchy correspond to build-ins. Build-in layers may have the same path as the corresponding layer in the final hierarchy, but only up to the closest linked ancestor.

In one or more embodiments, to determine the placement of build-ins relative to siblings, the merging process searches the final hierarchy for the next and previous linked layer in the same group. If a linked layer is found, the build-in is placed immediately before the next linked layer in the transition hierarchy or, if there is none, immediately after the previous linked layer. If there are no linked layers in the same group, the build-ins are placed at the top of the corresponding group in the transition hierarchy, on top of all build-outs (if present). The order of sequential unlinked layers is preserved between both the initial and final hierarchy and the transition hierarchy.

As illustrated in the example of FIG. 13, a transition hierarchy 1330 is generated based on an initial hierarchy 1310 and a final hierarchy 1320. Nodes 1350 and 1352 are linked, and nodes 1354 and 1356 are linked, which result in the links being crisscrossed between the initial hierarchy 1310 and final hierarchy 1320. In the transition hierarchy 1330, the merging process links node 1360 to nodes 1350 and 1352 from the initial hierarchy 1310 and final hierarchy 1320, and links node 1366 to nodes 1354 and 1356 from the initial hierarchy 1310 and final hierarchy 1320, respectively. Further, as shown, node 1362 is linked to node 1358 from the final hierarchy 1320.

Figure 14:
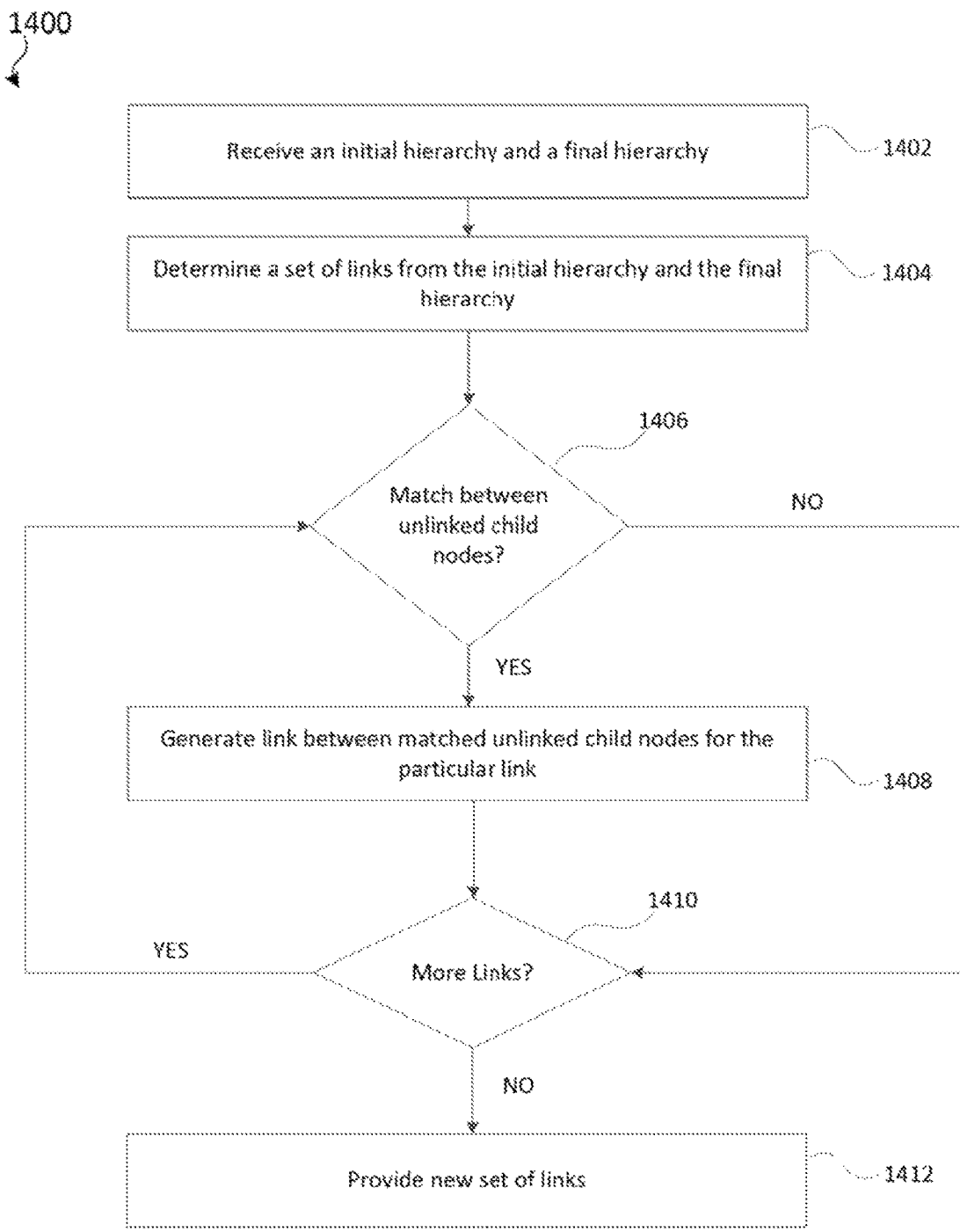
FIG. 14 is a flow chart illustrating steps in a method for autolinking nodes of an initial hierarchy and a final hierarchy, according to some embodiments of the subject technology.

FIG. 14 is a flow chart illustrating steps in a method 1400 for autolinking nodes of an initial hierarchy and a final hierarchy, according to some embodiments of the subject technology. Method 1400 may be performed at least partially by a user with any one of a plurality of client devices (e.g., any one of servers 130 and any one of client devices 110). The client devices may be handled by a user, such as through executing an application installed in the client device (e.g., the application 222). At least some of the steps in method 1400 may be performed by a computer having a processor executing commands stored in a memory of the computer (e.g., processors 212 and 236, memories 220 and 232). Further, steps as disclosed in method 1400 may include retrieving, editing, and/or storing files in a database that is part of, or is communicably coupled to, the computer, using an application (e.g., the autolinker 224 of the application 222). The database may include an asset database (e.g., the client asset database 230, and the asset database 252). Methods consistent with the present disclosure may include at least some, but not all of, the steps illustrated in method 1400, performed in a different sequence. Furthermore, methods consistent with the present disclosure may include at least two or more steps as in method 1400 performed overlapping in time, or almost simultaneously. In one or more embodiments, the method 1400 receives, as input, two hierarchies and a collection of linked layers, and provides a set of new links as output.

Step 1402 includes receiving an initial hierarchy and a final hierarchy. In some embodiments, each of the initial hierarchy and the final hierarchy includes a respective root layer with a respective root node.

Step 1404 includes determining a set of links from the initial hierarchy and the final hierarchy. In some embodiments, if not already linked, the root layers are now linked together. For example, the respective root layers are determined to be not linked, and a link between the respective root layers is generated. In an example, a queue of nodes is created that includes all existing links based on the determined set of links. While the queue of nodes is not empty, a link is removed from the queue for processing as described below.

At decision step 1406, the method 1400 determines whether there is a match between unlinked child nodes from initial and final hierarchies for a particular link from the set of links. In an example, for each unlinked child of the node in the link belonging to the initial hierarchy, a first match is searched for in the unlinked children of the node in the link belonging to the final hierarchy. In an embodiment, a match between child nodes of two different layers is determined when 1) the name of both child nodes is the same, or 2) both child nodes have a type property of text, and the content of both text nodes is the same (e.g., identical text content). For example, in some embodiments, determining the match between the unlinked child node to the second unlinked child node further includes determining that a name property of the unlinked child node matches a name property of the second unlinked child node, or determining that text content associated with the unlinked child node matches text content associated with the second unlinked child node. If there is a match in step 1406, the method 1400 continues to step 1408. When there is no match determined in step 1406, the method 1400 continues to step 1410.

Step 1408 includes generating a link between matched unlinked child nodes for the particular link. In an example, if a match is found, the two child layers are linked, and the new link is added to the queue.

At decision step 1410, if more links are still in the set of links, the method 1400 continues to step 1406 to repeat steps 1406 and 1408 as discussed above. Step 1412 includes providing a new set of links based on the results of aforementioned steps.

The following discussion relates to a method for merging hierarchies, which may be performed in conjunction with the method 1400 for autolinking described above.

Figure 15:
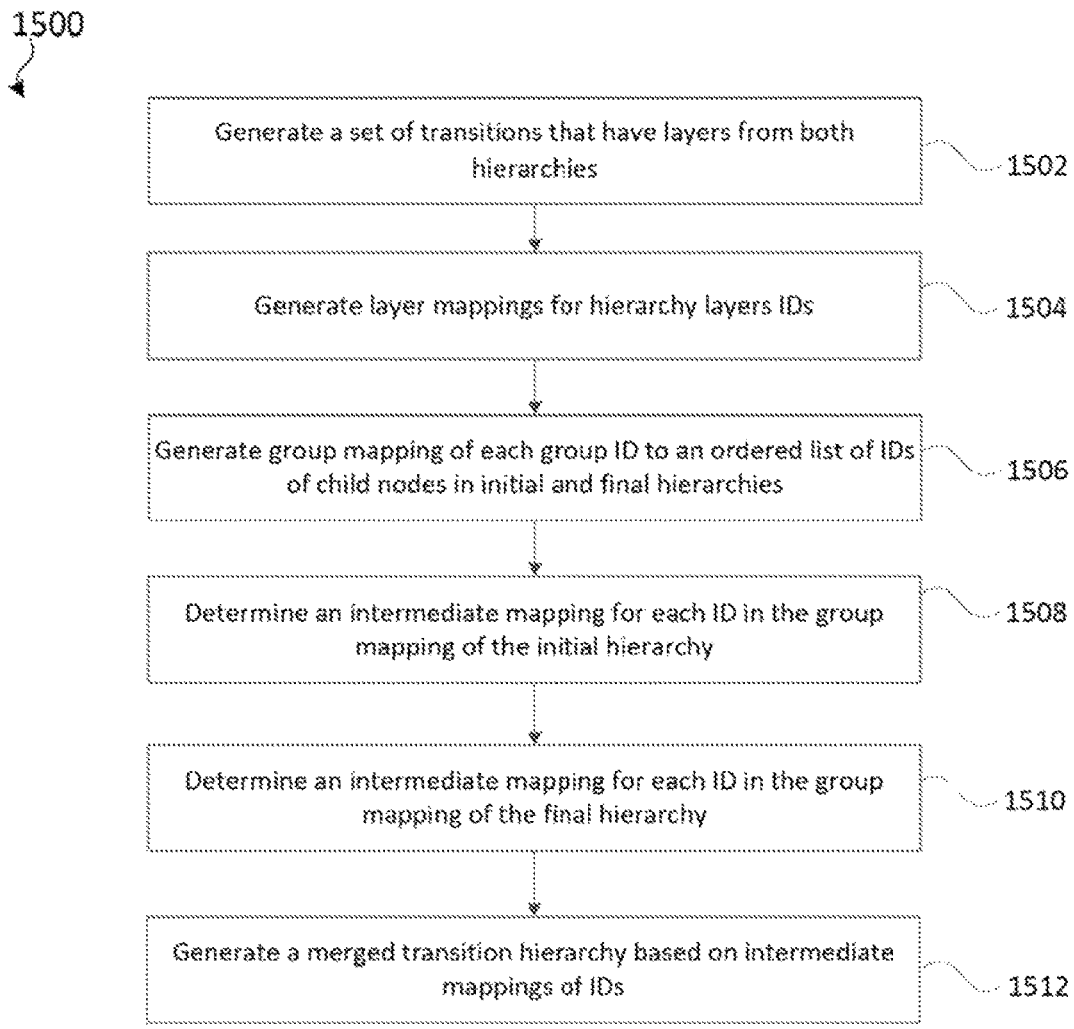
FIG. 15 is a flow chart illustrating steps in a method for merging an initial hierarchy and a final hierarchy, according to some embodiments of the subject technology.

FIG. 15 is a flow chart illustrating steps in a method 1500 for merging an initial hierarchy and a final hierarchy, according to some embodiments of the subject technology. Method 1500 may be performed at least partially by a user with any one of a plurality of client devices (e.g., any one of servers 130 and any one of client devices 110). The client devices may be handled by a user, such as through executing an application installed in the client device (e.g., the application 222). At least some of the steps in method 1500 may be performed by a computer having a processor executing commands stored in a memory of the computer (e.g., processors 212 and 236, memories 220 and 232). Further, steps as disclosed in method 1500 may include retrieving, editing, and/or storing files in a database that is part of, or is communicably coupled to, the computer, using an application (e.g., the merger 226 of the application 222). The database may include an asset database (e.g., the client asset database 230, and the asset database 252). Methods consistent with the present disclosure may include at least some, but not all of, the steps illustrated in method 1500, performed in a different sequence. Furthermore, methods consistent with the present disclosure may include at least two or more steps as in method 1500 performed overlapping in time, or almost simultaneously. In one or more embodiments, the method 1500 receives, as input, an initial hierarchy, a final hierarchy, and a set of transitions for each layer in those hierarchies, and outputs a hierarchy where each transition maps to a single layer.

Step 1502 includes generating a set of transitions that have layers from both hierarchies. In one or more embodiments, an empty mapping called "merged," for explanatory purposes herein, is initially generated that includes a mapping from an identifier (ID) to an ordered list of IDs. In an implementation, a set called "links," for explanatory purposes herein, is also generated that includes a set of transitions that have layers from both hierarchies.

Step 1504 includes generating layer mappings for hierarchy layer IDs. In an embodiment, a mapping is generated from an initial hierarchy layer ID to a final hierarchy layer ID, where the mapping is called "aToB" for purposes of explanation herein. Next, a mapping from a final hierarchy layer ID to an initial hierarchy layer ID, where the mapping is called "bToA" herein for explanatory purposes.

Step 1506 includes generating a group mapping of each group ID to an ordered list of IDs of child nodes in initial and final hierarchies. In an embodiment, for both the initial hierarchy and the final hierarchy, a mapping is generated from each group's ID to an ordered list of the IDs of all child nodes. For purposes of explanation herein, these mappings are called "a" and "b" respectively.

Step 1508 includes determining an intermediate mapping for each ID in the group mapping of the initial hierarchy. In one or more embodiments, the following operations may be performed for determining this intermediate mapping for the initial hierarchy:

For each ID "aid" in a:
  a. If there is a mapping for aid in aToB, name the value "bid"
  b. If bid is specified and there is a mapping in b for bid, then:
    i. Get the value in b for bid and name it "bLayers"
    ii. Create a new ordered list by filtering bLayers to keys that are not in bToA and name. it "unlinkedLayers"
    iii. Create a copy of the layers in a for the key aid and name it "targetLayers"
    iv. For each ID "lid" in unlinkedLayers:
      1. Get the index for lid in bLayers and name it "bPos"
      2. Starting with the index i just before lid and counting down:
        a. If there is no index before lid, add lid to the front of targetLayers
        b. Get the ID for the index in bLayers and call it "prevId"
        c. If prevId is mapped in links:
          i. Get the ID "aid2" that prevId is mapped to in links
          ii. If aid2 is in targetLayers, add lid to targetLayers just after aid2
          iii. Otherwise continue on to the previous index (decrement i and skip step d below)
        d. Otherwise, add lid to targetLayers just after prevId
  c. Otherwise return the value for the key in a Step 1510 includes determining an intermediate mapping for each ID in the group mapping of the final hierarchy. In one or more embodiments, for each key in b, if there is no mapping in bToA (unlinked), then an entry is added to merged for the key and its value in b.

Step 1512 includes generating a merged transition hierarchy based at least in part on the intermediate mapping of IDs. In one or more embodiments, a hierarchy for merged is generated by finding the transition for each key (by ID) and setting the child nodes of the node to the transitions in the ordered value list (also by ID). Additionally, the type of each transition is set to the type of the initial layer if it exists, otherwise the type of the transition is set to the type of the final layer.

Hardware Overview

Figure 16:
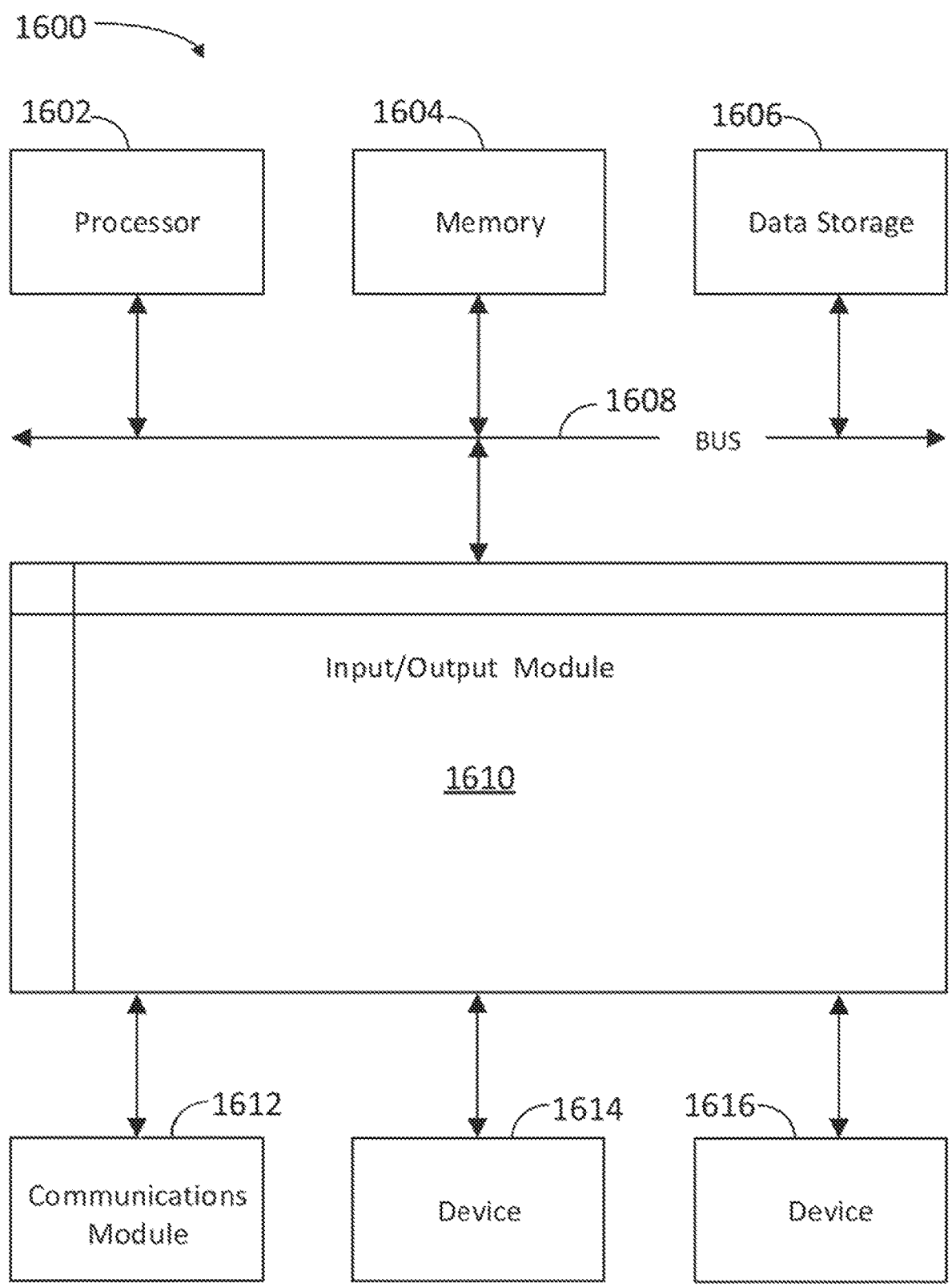
FIG. 16 is a block diagram illustrating an example computer system with which the client and server of FIGS. 1 and 2 and the methods of FIGS. 14 and 15 can be implemented.

FIG. 16 is a block diagram illustrating an exemplary computer system 1600 with which the client device 110 and server 130 of FIGS. 1 and 2, and the methods of FIGS. 14 and 15 can be implemented. In certain aspects, the computer system 1600 may be implemented using hardware or a combination of software and hardware, either in a dedicated server, or integrated into another entity, or distributed across multiple entities.

Computer system 1600 (e.g., client device 110 and server 130) includes a bus 1608 or other communication mechanism for communicating information, and a processor 1602 (e.g., processors 212 and 236) coupled with bus 1608 for processing information. By way of example, the computer system 1600 may be implemented with one or more processors 1602. Processor 1602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1600 can include, in addition to hardware, code that creates an execution environment for the computer program in question, e.g., code that constitutes processor firmware, a protocol stack, a database management system, an operating system, or a combination of one or more of them stored in an included memory 1604 (e.g., memories 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1608 for storing information and instructions to be executed by processor 1602. The processor 1602 and the memory 1604 can be supplemented by, or incorporated in, special purpose logic circuitry.

The instructions may be stored in the memory 1604 and implemented in one or more computer program products, e.g., one or more modules of computer program instructions encoded on a computer readable medium for execution by, or to control the operation of, the computer system 1600, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1604 may also be used for storing temporary variable or other intermediate information during execution of instructions to be executed by processor 1602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1600 further includes a data storage device 1606 such as a magnetic disk or optical disk, coupled to bus 1608 for storing information and instructions. Computer system 1600 may be coupled via input/output module 1610 to various devices. Input/output module 1610 can be any input/output module. Exemplary input/output modules 1610 include data ports such as USB ports. The input/output module 1610 is configured to connect to a communications module 1612. Exemplary communications modules 1612 (e.g., communications modules 218 and 238) include networking interface cards, such as Ethernet cards and modems. In certain aspects, input/output module 1610 is configured to connect to a plurality of devices, such as an input device 1614 (e.g., input device 214) and/or an output device 1616 (e.g., output device 216). Exemplary input devices 1614 include a keyboard and a pointing device, e.g., a mouse or a trackball, by which a user can provide input to the computer system 1600. Other kinds of input devices 1614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1616 include display devices, such as an LCD (liquid crystal display) monitor, for displaying information to the user.

According to one aspect of the present disclosure, the client device 110 and server 130 can be implemented using a computer system 1600 in response to processor 1602 executing one or more sequences of one or more instructions contained in memory 1604. Such instructions may be read into memory 1604 from another machine-readable medium, such as data storage device 1606. Execution of the sequences of instructions contained in main memory 1604 causes processor 1602 to perform the process steps described herein. One or more processors in a multi-processing arrangement may also be employed to execute the sequences of instructions contained in memory 1604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1600 can include clients and servers. A client and server are generally remote from each other and typically interact through a communication network. The relationship of client and server arises by virtue of computer programs running on the respective computers and having a client-server relationship to each other. Computer system 1600 can be, for example, and without limitation, a desktop computer, laptop computer, or tablet computer. Computer system 1600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 1602 for execution. Such a medium may take many forms, including, but not limited to, non-volatile media, volatile media, and transmission media. Non-volatile media include, for example, optical or magnetic disks, such as data storage device 1606. Volatile media include dynamic memory, such as memory 1604. Transmission media include coaxial cables, copper wire and fiber optics, including the wires forming bus 1608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description of the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   receiving an initial hierarchy and a final hierarchy, the initial hierarchy and the final hierarchy including respective root layers;
   determining a first set of links from the initial hierarchy and the final hierarchy;
   for each link from the first set of links:
      identifying an unlinked child node from the initial hierarchy of a particular link;

determining a match between the unlinked child node to a second unlinked child node from the final hierarchy of the particular link;

selecting a custom animation curve for a single property associated with the unlinked child node and the second unlinked child node; and generating a respective link between the unlinked child node to the second unlinked child node based on the custom animation curve; and providing a new set of links based at least in part on the respective link and the first set of links.

2. The computer-implemented method of claim 1, further comprising:

determining that the respective root layers are not linked; and generating a link between the respective root layers.

3. The computer-implemented method of claim 1, wherein determining the match between the unlinked child node to the second unlinked child node further comprises:

determining that a name property of the unlinked child node matches a name property of the second unlinked child node.

4. The computer-implemented method of claim 1, wherein determining the match between the unlinked child node to the second unlinked child node further comprises:

determining that text content associated with the unlinked child node matches text content associated with the second unlinked child node.

5. The computer-implemented method of claim 1, wherein the initial hierarchy and the final hierarchy include a respective root node and a respective set of child nodes, each node including a name property, a universally unique identifier, a type property, or text content.

6. The computer-implemented method of claim 5, wherein the respective set of child nodes are ordered by a z-index.

7. The computer-implemented method of claim 1, further comprising:

generating an animation based at least in part on the new set of links.

8. The computer-implemented method of claim 7, wherein generating the animation further comprises:

determining a set of transitions between the initial hierarchy and the final hierarchy, wherein each transition comprises a specification of a particular layer, the specification including a type property, an initial set of properties, a final set of properties, and information corresponding to at least timing of changes between the initial and final properties; and generating a transition hierarchy based on the set of transitions, wherein each transition, from the set of transitions, maps to a respective node and the transition hierarchy indicates an ordering of the set of transitions during the animation.

9. The computer-implemented method of claim 8, further comprising:

providing for display the animation.

10. The computer-implemented method of claim 9, wherein providing for display the animation further comprises:

displaying the animation based at least in part on the set of transitions and the transition hierarchy.

11. A system comprising:

one or more processors; and a memory coupled to the one or more processors, the memory including instructions that, when executed by the one or more processors, cause the one or more processors to:

receive an initial hierarchy and a final hierarchy, the initial hierarchy and the final hierarchy including respective root layers, each of the respective root layers including at least one child node;

determine that the respective root layers are not linked;

generate a link between the respective root layers;

determine a first set of links from the initial hierarchy and the final hierarchy, the first set of links including at least the link between the respective root layers;

for each link from the first set of links:

identify an unlinked child node from the initial hierarchy of a particular link;

determine a match between the unlinked child node to a second unlinked child node from the final hierarchy of the particular link;

select a custom animation curve for a single property associated with the unlinked child node and the second unlinked child node; and generate a respective link between the unlinked child node to the second unlinked child node based on the custom animation curve; and provide a new set of links based at least in part on the respective link and the first set of links.

12. The system of claim 11, wherein to determine the match between the unlinked child node to the second unlinked child node further causes the one or more processors to:

determine that a name property of the unlinked child node matches a name property of the second unlinked child node.

13. The system of claim 11, wherein to determine between the unlinked child node to the second unlinked child node further causes the one or more processors to:

determine that text content associated with the unlinked child node matches text content associated with the second unlinked child node.

14. The system of claim 11, wherein the initial hierarchy and the final hierarchy include a respective root node and a respective set of child nodes, each node including a name property, a universally unique identifier, a type property, or text content.

15. The system of claim 14, wherein the respective set of child nodes are ordered by a z-index.

16. The system of claim 11, wherein the memory includes further instructions that, when executed by the one or more processors, further causes the one or more processors to:

generate an animation based at least in part on the new set of links.

17. The system of claim 16, wherein to generate the animation further causes the one or more processors to:

determine a set of transitions between the initial hierarchy and the final hierarchy, wherein each transition comprises a specification of a particular layer, the specification including a type property, an initial set of properties, a final set of properties, and information corresponding to at least timing of changes between the initial and final properties; and generate a transition hierarchy based on the set of transitions, wherein each transition, from the set of transitions, maps to a respective node and the transition hierarchy indicates an ordering of the set of transitions during the animation.

18. The system of claim 17, wherein the memory includes further instructions that, when executed by the one or more processors, further causes the one or more processors to:
provide for display the animation.

19. The system of claim 18, wherein to provide for display the animation further causes the one or more processors to:
display the animation based at least in part on the set of transitions and the transition hierarchy.

20. A non-transitory computer-readable medium comprising instructions, which when executed by a computing device, cause the computing device to perform operations comprising:
receiving an initial hierarchy and a final hierarchy, the initial hierarchy and the final hierarchy including respective root layers;
determining a first set of links from the initial hierarchy and the final hierarchy;
for each link from the first set of links:
identifying an unlinked child node from the initial hierarchy of a particular link;
determining a match between the unlinked child node to a second unlinked child node from the final hierarchy of the particular link;
selecting a custom animation curve for a single property associated with the unlinked child node and the second unlinked child node; and
generating a respective link between the unlinked child node to the second unlinked child node based on the custom animation curve;
providing a new set of links based at least in part on the respective link and the first set of links; and
generating an animation based at least in part on the new set of links, the animation providing a transition from a graphical representation based on the initial hierarchy to a second graphical representation based on the final hierarchy.

* * * * *